US009998715B2

(12) United States Patent
Koizumi

(10) Patent No.: US 9,998,715 B2
(45) Date of Patent: Jun. 12, 2018

(54) SOLID-STATE IMAGING DEVICE, IMAGING SYSTEM, AND SIGNAL PROCESSING METHOD CORRECTING A READ-OUT SIGNAL

(71) Applicant: CANON KABUSHIKI KAISHA, Tokyo (JP)

(72) Inventor: Satoshi Koizumi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 86 days.

(21) Appl. No.: 15/066,048

(22) Filed: Mar. 10, 2016

(65) Prior Publication Data

US 2016/0309102 A1    Oct. 20, 2016

(30) Foreign Application Priority Data

Apr. 17, 2015   (JP) .................................. 2015-084837

(51) Int. Cl.
| | |
|---|---|
| *H04N 5/335* | (2011.01) |
| *H04N 9/04* | (2006.01) |
| *H04N 5/355* | (2011.01) |
| *H04N 5/369* | (2011.01) |

(52) U.S. Cl.
CPC ......... *H04N 9/045* (2013.01); *H04N 5/35527* (2013.01); *H04N 5/3696* (2013.01)

(58) Field of Classification Search
None
See application file for complete search history.

(56) References Cited

U.S. PATENT DOCUMENTS

2015/0279898 A1    10/2015  Kobayashi et al.

FOREIGN PATENT DOCUMENTS

| JP | 2005-294921 | 10/2005 |
| JP | 2013-149743 | 8/2013 |
| JP | 2014-232988 | 12/2014 |

*Primary Examiner* — Stephen Coleman
(74) *Attorney, Agent, or Firm* — Fitzpatrick, Cella, Harper & Scinto

(57) ABSTRACT

A solid-state imaging device includes a photoelectric conversion unit including one microlens and a plurality of photoelectric conversion elements, a read-out circuit unit configured to read out a first signal based on charges accumulated by one of the photoelectric conversion elements and a second signal based on charges accumulated by another one of the photoelectric conversion elements, and a signal processing unit configured to, in a case where the first signal is larger than a predetermined saturation signal level and the second signal, correct the first signal to a predetermined signal level based on the second signal so that a change rate of a third signal obtained by adding the first and second signals relative to a light amount approximates to the change rate in a case where the first signal is smaller than the predetermined saturation signal level.

13 Claims, 10 Drawing Sheets

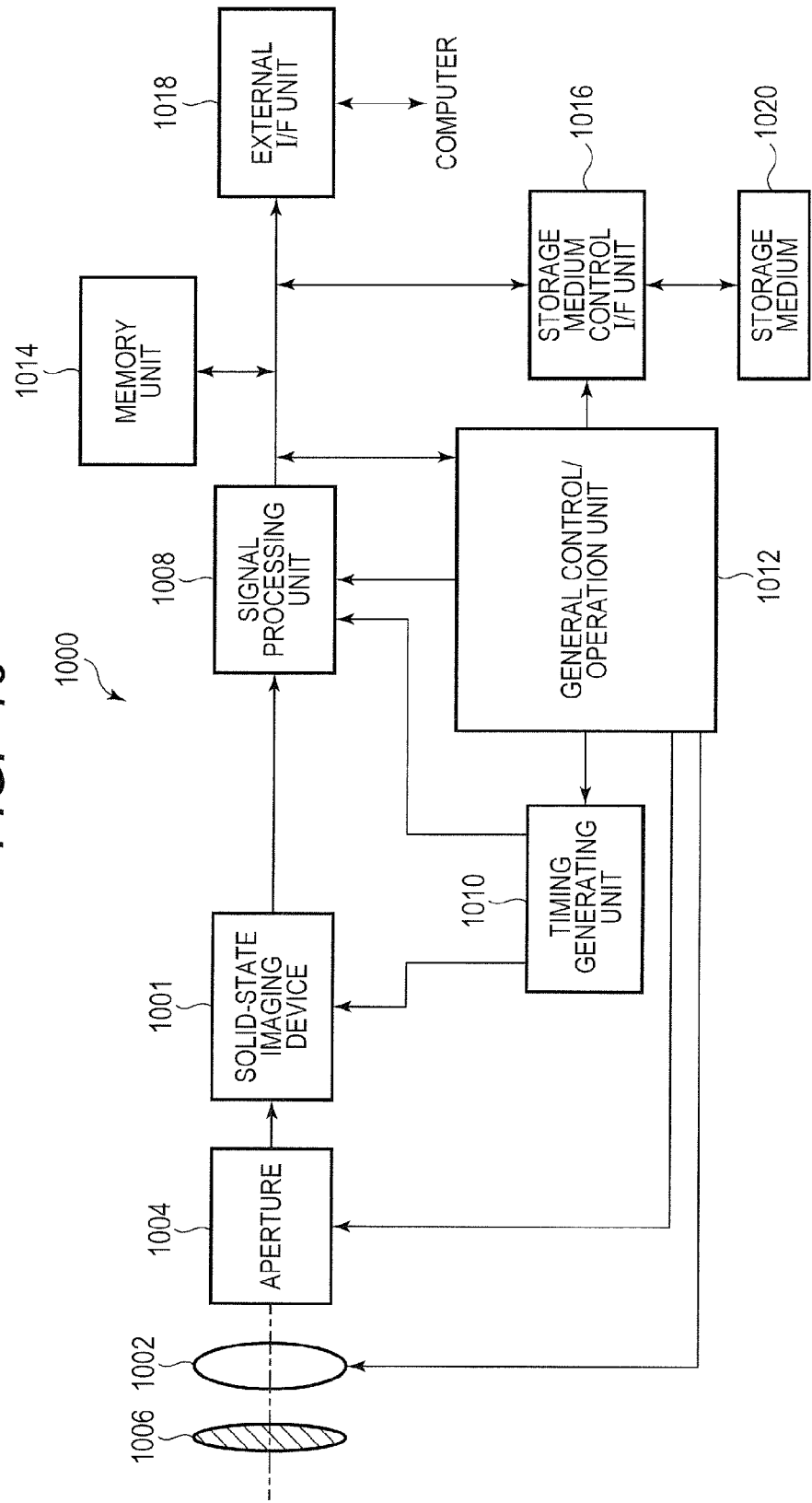

//  SOLID-STATE IMAGING DEVICE, IMAGING SYSTEM, AND SIGNAL PROCESSING METHOD CORRECTING A READ-OUT SIGNAL

BACKGROUND OF THE INVENTION

Field of the Invention

The present invention relates to a solid-state imaging device, an imaging system, and a signal processing method.

Description of the Related Art

In some of solid-state imaging devices, signals generated by plural photoelectric conversion elements are processed as one pixel signal. As a technique used in such processing, Japanese Patent Application Laid-Open No. 2013-149743 describes a technique in which a potential barrier between plural photoelectric conversion elements is reduced so that an appropriate signal can be obtained even when there are differences in sensitivity and incident light amount between the plural photoelectric conversion elements.

However, in the aforementioned conventional technique, reducing the potential barrier between the photoelectric conversion elements reduces a saturation signal level of each of the photoelectric conversion elements, and causes reduction of the dynamic range of an output signal, in some cases.

SUMMARY OF THE INVENTION

An object of the present invention is to provide a solid-state imaging device and an imaging system which can suppress degrading of image quality due to saturation of a signal when one image signal is generated based on signals from plural photoelectric conversion elements.

According to one aspect of the present invention, there is provided a solid-state imaging device including a photoelectric conversion unit including one microlens and a plurality of photoelectric conversion elements, a read-out circuit unit configured to read out a first signal based on charges accumulated by one of the plurality of photoelectric conversion elements and a second signal based on charges accumulated by another one of the plurality of photoelectric conversion elements, and a signal processing unit configured to, in a case where the first signal is larger than a predetermined saturation signal level and the second signal, correct the first signal to a predetermined signal level based on the second signal so that a change rate of a third signal obtained by adding the first signal and the second signal relative to a light amount approximates to a change rate of the third signal relative to a light amount in a case where the first signal is smaller than the predetermined saturation signal level.

According to another aspect of the present invention, there is provided a signal processing method in a solid-state imaging device including a photoelectric conversion unit including one microlens and a plurality of photoelectric conversion elements, the method including reading out a first signal based on charges accumulated by one of the plurality of photoelectric conversion elements, reading out a second signal based on charges accumulated by another one of the plurality of photoelectric conversion elements, and in a case where the first signal is larger than a predetermined saturation signal level and the second signal, correcting the first signal to a predetermined signal level based on the second signal so that a change rate of a third signal obtained by adding the first signal and the second signal relative to a light amount approximates to a change rate of the third signal relative to a light amount in a case where the first signal is smaller than the predetermined saturation signal level.

According to further another aspect of the present invention, there is provided an imaging system including a solid-state imaging device including a photoelectric conversion unit including one microlens and a plurality of photoelectric conversion elements, and a read-out circuit unit configured to read out a first signal based on charges accumulated by one of the plurality of photoelectric conversion elements and a second signal based on charges accumulated by another one of the plurality of photoelectric conversion elements, and a signal processing unit configured to correct, in a case where the first signal is larger than a predetermined saturation signal level and the second signal, the first signal to a predetermined signal level based on the second signal so that a change rate of a third signal obtained by adding the first signal and the second signal relative to a light amount approximates to a change rate of the third signal relative to a light amount in a case where the first signal is smaller than the predetermined saturation signal level, and generate image data based on the third signal obtained by adding the corrected first signal and the second signal.

Further features of the present invention will become apparent from the following description of exemplary embodiments with reference to the attached drawings.

BRIEF DESCRIPTION OF THE DRAWINGS

FIG. 10 is a block diagram illustrating a schematic configuration of an imaging system according to a third embodiment of the present invention.

DESCRIPTION OF THE EMBODIMENTS

Preferred embodiments of the present invention will now be described in detail in accordance with the accompanying drawings.

First Embodiment

A solid-state imaging device and a signal processing method according to a first embodiment of the present invention will be described with reference to FIGS. 1 to 5.

Figure 1:
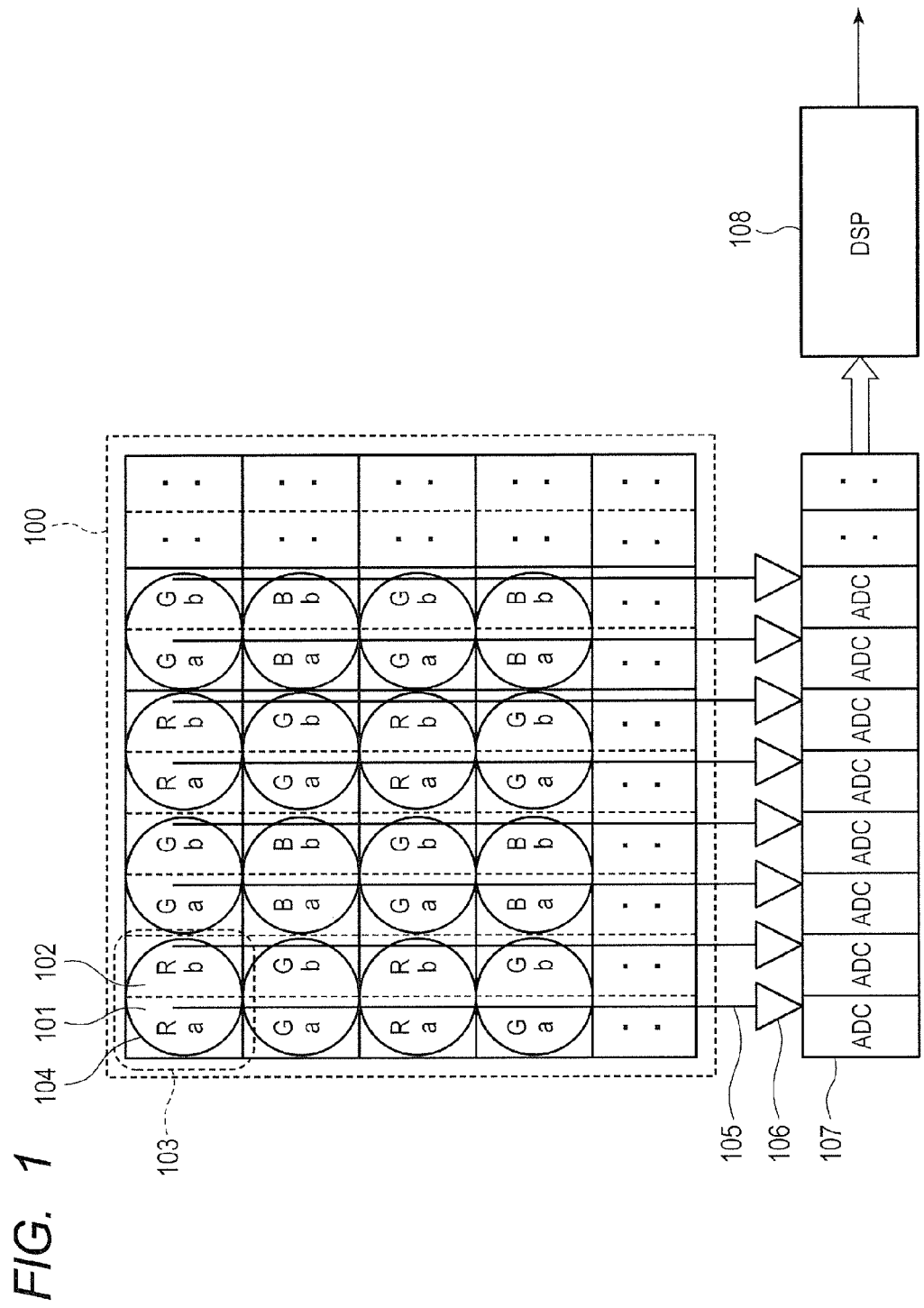
FIG. 1 is a schematic view illustrating a configuration example of a solid-state imaging device according to a first embodiment of the present invention.
Figure 2:
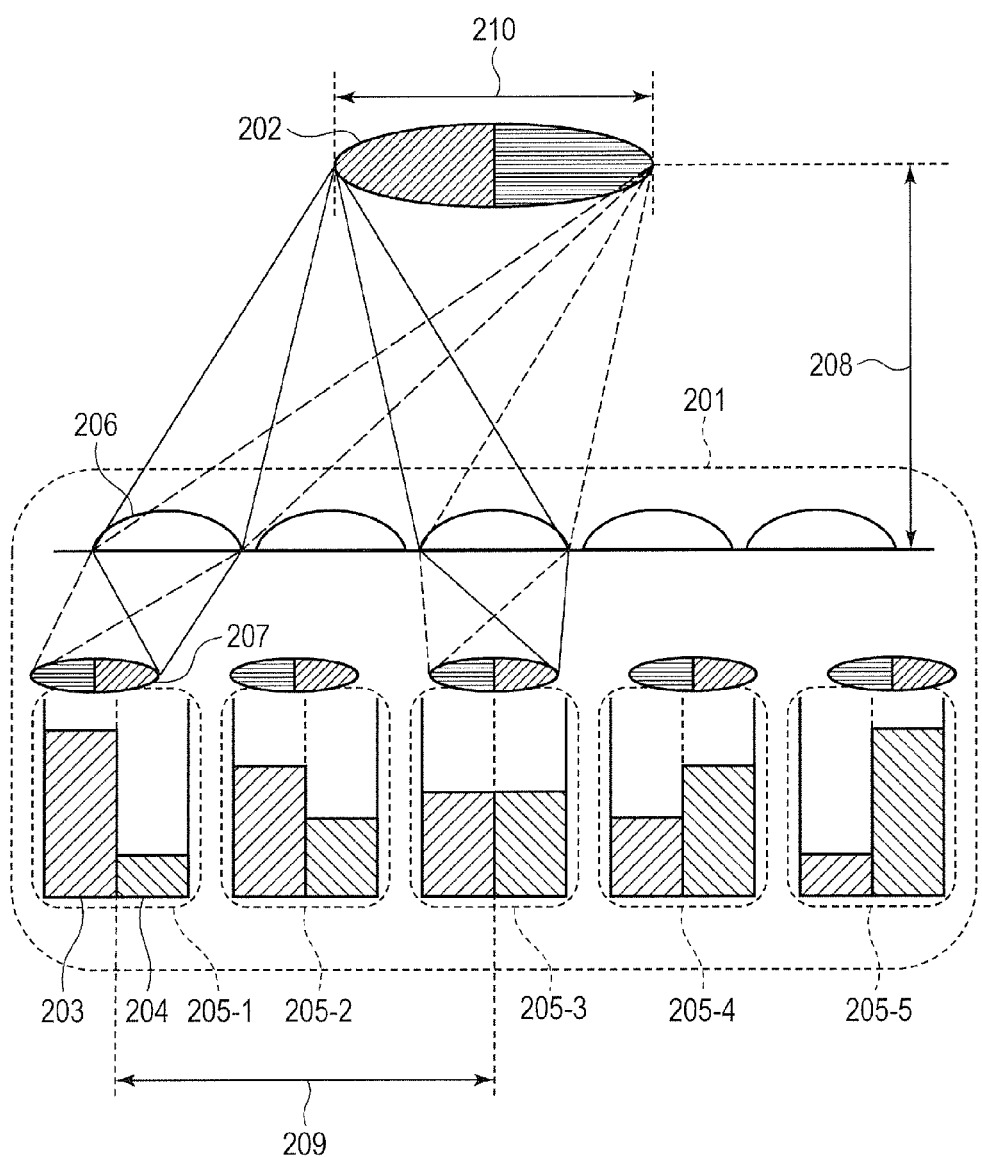
FIG. 2 is a schematic cross-sectional view illustrating an example of an imaging unit including the solid-state imaging device according to the first embodiment of the present invention.
Figure 3:
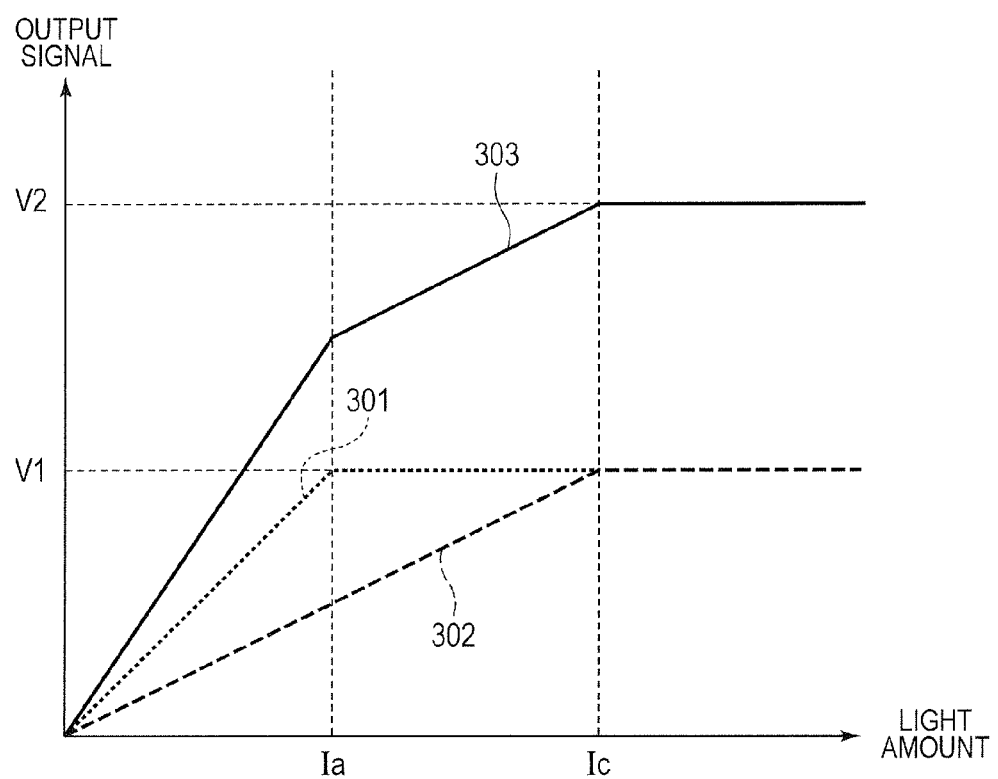
FIG. 3 is a graph illustrating an example of input-output characteristics before a signal processing according to the first embodiment of the present invention.
Figure 4:
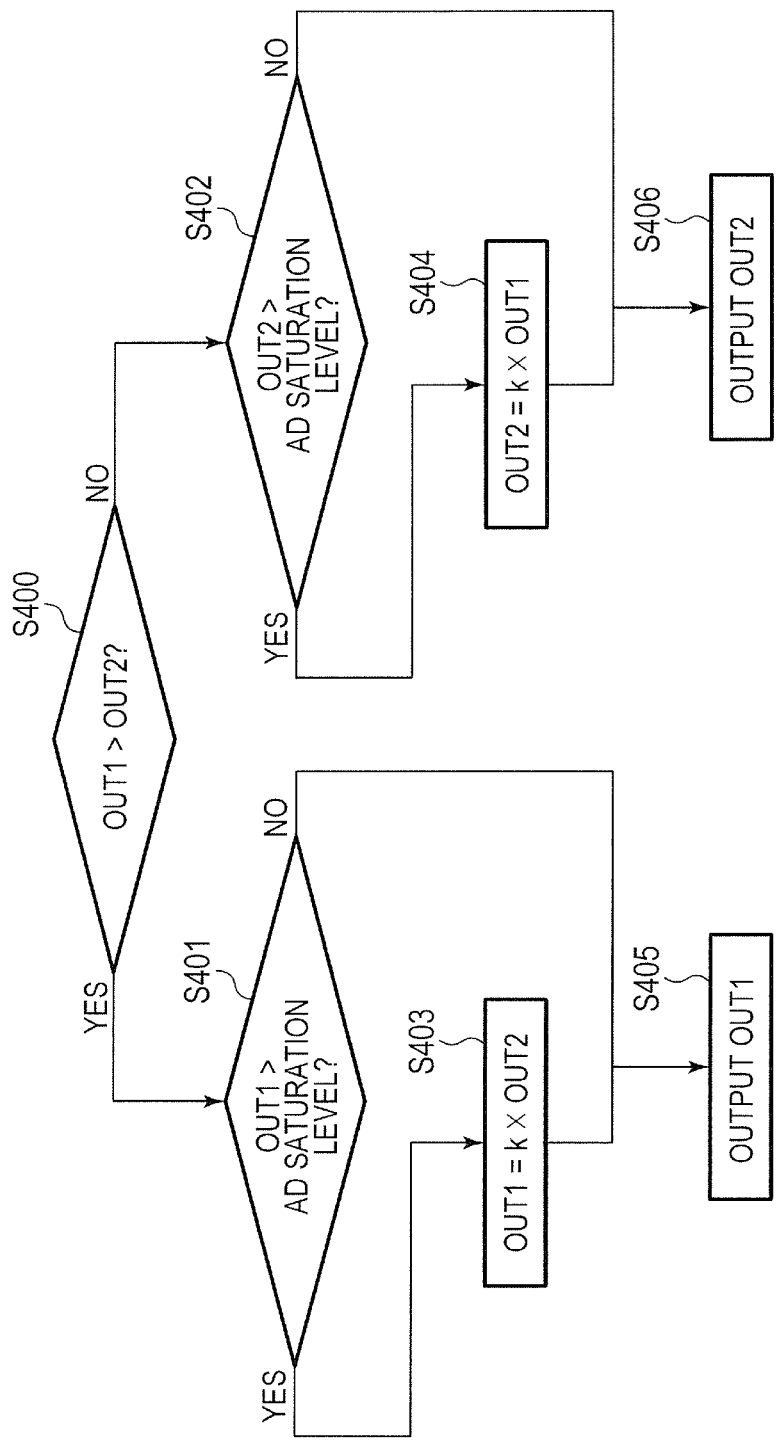
FIG. 4 is a flowchart illustrating a signal processing method in the solid-state imaging device according to the first embodiment of the present invention.
Figure 5:
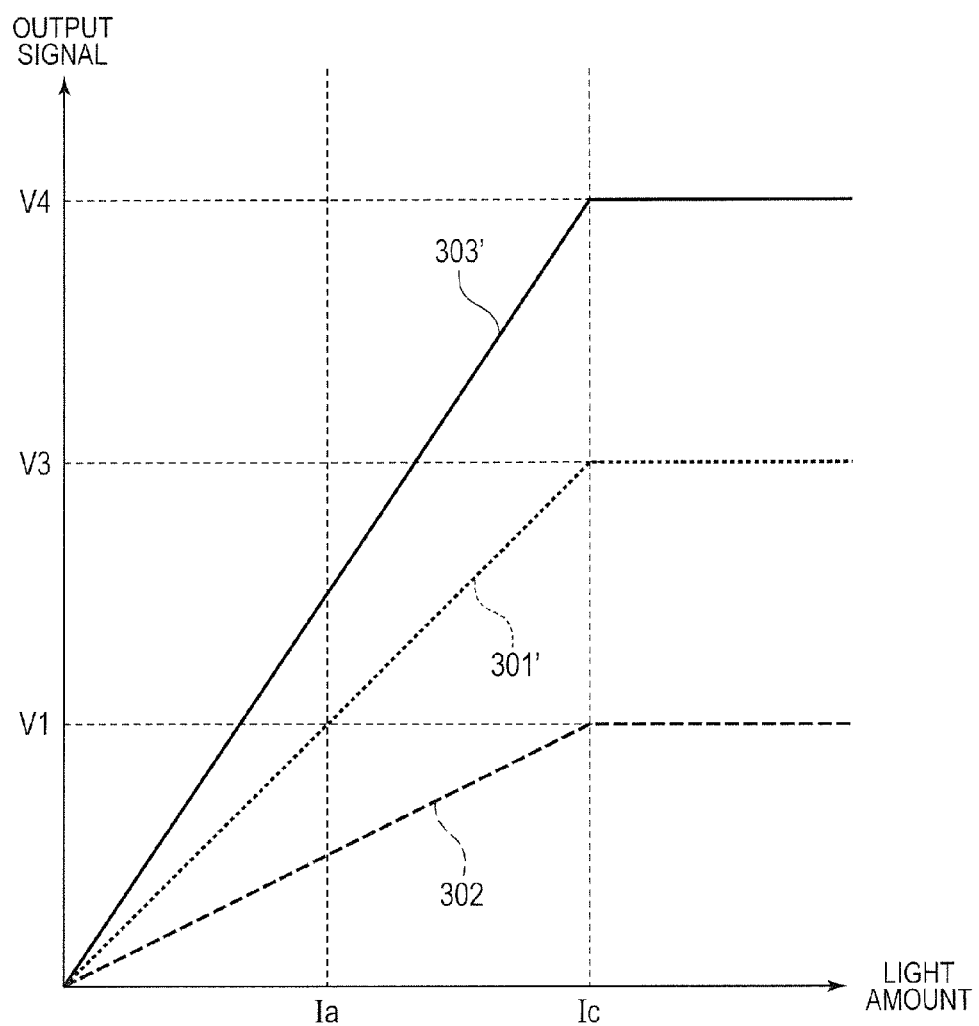
FIG. 5 is a graph illustrating an example of the input-output characteristics after the signal processing according to the first embodiment of the present invention.

FIG. 1 is a schematic view illustrating a configuration example of the solid-state imaging device according to the present embodiment. FIG. 2 is a schematic cross-sectional view illustrating an example of an imaging unit including the solid-state imaging device according to the present embodiment. FIG. 3 is a graph illustrating an example of input-output characteristics before a signal processing according to the present embodiment. FIG. 4 is a flowchart illustrating a signal processing method in the solid-state imaging device according to the present embodiment. FIG. 5 is a graph illustrating an example of input-output characteristics after the signal processing according to the present embodiment.

First, the structure of the solid-state imaging device according to the present embodiment is described with reference to FIGS. 1 and 2.

The solid-state imaging device according to the present embodiment which is, for example, a CMOS image sensor has an imaging region 100 in which a plurality of photoelectric conversion units 103 are arranged in a two-dimensional array in a row direction and a column direction as illustrated in FIG. 1. The imaging region 100 is not limited to a particular configuration and may include, for example, an array of the photoelectric conversion units 103 with 1080 rows and 1920 columns. In FIG. 1, an array of the photoelectric conversion units 103 with 4 rows and 4 columns out of such an array are extracted and illustrated.

Each of the photoelectric conversion units 103 includes two photoelectric conversion elements 101, 102, one microlens 104, and a not-illustrated color filter. In each photoelectric conversion unit 103, light passing through the microlens 104 can be detected by the photoelectric conversion element 101 and the photoelectric conversion element 102. In such a structure, a phase difference focus detection can be performed by using a signal obtained from the photoelectric conversion element 101 and a signal obtained from the photoelectric conversion element 102. Moreover, signal data for a pixel forming a captured image can be obtained by adding the signal obtained from the photoelectric conversion element 101 and the signal obtained from the photoelectric conversion element 102.

Reference signs a and b illustrated in each pair of the photoelectric conversion elements 101, 102 in FIG. 1 respectively denote an A signal and a B signal which are color signals obtained by left-right pupil division. Specifically, the photoelectric conversion element 101 is a photoelectric conversion element for obtaining the A signal and the photoelectric conversion element 102 is a photoelectric conversion element for obtaining the B signal. Moreover, reference signs R, G, B denote colors of the color filters. R denotes a red filter, G denotes a green filter, and B denotes a blue filter. The color filters of the same color are assigned to the two photoelectric conversion elements 101, 102 forming one photoelectric conversion unit 103. Note that, although FIG. 1 illustrates an example where the color filters are arranged in a so-called Bayer arrangement, the arrangement of the color filters is not limited to this.

A plurality of signal output lines 105 extending in the column direction are arranged in the imaging region 100. Two signal output lines 105 are disposed in each column. One of the two signal output lines 105 is a signal line for outputting the A signals from the photoelectric conversion elements 101 of the photoelectric conversion units 103 aligned in the column direction, and the other signal output line 105 is a signal line for outputting the B signals from the photoelectric conversion elements 102 of the photoelectric conversion units 103 aligned in the column direction. Note that the A signals and the B signals are outputted from the photoelectric conversion elements 101, 102 to the signal output lines 105 via not-illustrated in-pixel read-out circuits provided in the photoelectric conversion units 103.

Each of the signal output lines 105 is connected to an AD convertor (ADC) 107 via a column amplifier 106. A digital signal processor (hereafter, referred to as DSP) 108 is connected to the AD convertor 107. The column amplifier 106 and the AD convertor 107 are a read-out circuit unit for reading out pixel signals from the imaging region 100. The DSP 108 determines whether a color signal is saturated, from digital data outputted from each AD convertor 107, and performs later-described computing processing on the saturated signal. Such a configuration enables high-speed read-out of signals with high S/N ratio. The signal data for the pixel forming the captured image is obtained by adding pieces of signal data from the photoelectric conversion elements 101, 102 which are subjected to the computing processing by the DSP 108. Note that, in the following description, the column amplifier 106 and the AD convertor 107 are sometimes collectively referred to as "circuit unit."

FIG. 2 is a schematic cross-sectional view illustrating an imaging unit including a solid-state imaging device 201 according to the present embodiment. Light passing through an exit pupil 202 of an imaging lens falls on the solid-state imaging device 201 disposed away from the exit pupil 202 by an exit pupil distance 208. The solid-state imaging device 201 has microlenses 206 and photoelectric conversion units 205 each including two photoelectric conversion elements 203, 204 as described above. Generally, the size of the exit pupil 202 of the imaging lens is in the order of millimeters while the size of the photoelectric conversion units 205 is in the order of micrometers. Since illustrating the exit pupil 202 and the photoelectric conversion units 205 in an actual ratio makes the description difficult, some of the components of the solid-state imaging device 201 are picked out and illustrated in an enlarged manner. Specifically, in FIG. 2, a photoelectric conversion unit 205-3 is an enlarged view of the photoelectric conversion unit 205 in a center portion where the image height is zero, photoelectric conversion units 205-1, 205-5 are enlarged views of the photoelectric conversion units 205 at left and right positions where the image height is large, and photoelectric conversion units 205-2, 205-4 are enlarged views of photoelectric conversion units 205 at left and right positions where the image height is an intermediate level.

Through the microlenses 206, the exit pupil 202 of the imaging lens forms exit pupil images 207 on the respective surfaces of the photoelectric conversion units 205. At a position where the image height is large, the center of the exit pupil image 207 and the center of the photoelectric conversion unit 205 are not aligned, except for the case where the exit pupil distance 208 and the pitch of the microlenses 206 satisfy a certain condition. Accordingly, there is a difference in the amount of incident light, i.e. a difference in sensitivity between the two photoelectric conversion elements 203, 204 included in one photoelectric conversion unit 205. Note that the specific condition is a relationship between the exit pupil distance 208 and the pitch of the microlenses 206 in the case where the center of the exit pupil image 207 and the center of the photoelectric conversion unit 205 are aligned with each other.

In FIG. 2, the area of a shaded portion illustrated in each of the photoelectric conversion elements 203, 204 corresponds to the sensitivity determined by the amount of a signal charge accumulated in the photoelectric conversion element 203, 204. FIG. 2 schematically illustrates how the difference in sensitivity between the photoelectric conversion elements varies depending on the image height when the exit pupil distance 208 relative to the pitch of the microlenses 206 as viewed in the image height direction (in this case, the horizontal direction) is shorter than that in the case where the aforementioned specific condition is satisfied. Note that factors which cause the center position of the exit pupil image 207 to change include the exit pupil distance 208 of the imaging lens and a horizontal image height 209, and factors which cause the diameter of the exit pupil image 207 to change include a pupil diameter 210 of the imaging lens. The center position and the diameter of the exit pupil image 207 determine the degree of difference in sensitivity between the photoelectric conversion element 203 and the photoelectric conversion element 204.

As described above, the signal data for the pixel forming the captured image is obtained by adding the signal data from the photoelectric conversion element 203 and the signal data from the photoelectric conversion element 204. When there is a difference in sensitivity between the photoelectric conversion element 203 and the photoelectric conversion element 204, there is sometimes a case where the signal from one photoelectric conversion element becomes far larger than the signal from the other photoelectric conversion element depending on imaging conditions, and only the signal data from the one photoelectric conversion element is saturated. When the signal data from one of the photoelectric conversion elements is saturated, the linearity of the input-output characteristic in a bright portion of the captured image is degraded, and this causes degrading of image quality such as color shift.

FIG. 3 is graph illustrating examples of an input-output characteristic 301 of the photoelectric conversion element 203 with relatively-high sensitivity, an input-output characteristic 302 of the photoelectric conversion element 204 with relatively-low sensitivity, and an input-output characteristic 303 obtained by combining the input-output characteristics 301, 302. The horizontal axis represents an inputted light amount, and the vertical axis represents a signal level of digital data after AD conversion.

In the example of FIG. 3, the output signal from the photoelectric conversion element 203 is saturated in the circuit unit when the inputted light amount exceeds a certain light amount Ia. A signal level V1 is a signal level at which the output signal is saturated in the circuit unit. The output signal from the photoelectric conversion element 204 is saturated in the circuit unit when the inputted light amount exceeds a light amount Ic which is larger than the light amount Ia. In the case described above, as illustrated in FIG. 3, a slope of the input-output characteristic 303 obtained by combining the input-output characteristics 301, 302 decreases at or above the light amount Ia and the linearity is degraded. Note that the input-output characteristic 303 is such that, at or above the light amount Ic, the level of the output signal is a signal level V2 ($=2 \times V1$) which is obtained by adding the circuit saturation signal level V1 of the output signal from the photoelectric conversion element 203 and the circuit saturation signal level V1 of the output signal from the photoelectric conversion element 204.

AD saturation can be given as an example of the saturation in the circuit unit. The AD saturation means that the output signal has reached an upper limit value of a digital signal. The upper limit value of the digital signal normally corresponds to a signal level of $2^{n-1}$ in a case of an n-bit signal. The signal level at which the output signal is saturated in the circuit unit is a predetermined signal level determined depending on the configuration of the circuit unit. Note that, although the saturation in the circuit unit is sometimes referred to as "AD saturation" in the following description for simplification, this does not mean that the saturation in the circuit unit is limited to the AD saturation. Voltage saturation may also occur in the case of an analog signal, at an upper limit value of a dynamic range of the circuit. In the present invention, the saturation in the circuit unit includes not only the AD saturation but also the voltage saturation of the analog signal.

When the AD saturation occurs in data outputted from one of the photoelectric conversion elements as described above, the linearity of image data obtained by adding pieces of data outputted from the two photoelectric conversion elements 203, 204 is degraded. The signal processing method according to the present embodiment is an improvement method for suppressing the degrading of the linearity of the image data which occurs when data outputted from one of the photoelectric conversion elements is AD-saturated.

Next, the signal processing method according to the present embodiment is described with reference to FIGS. 4 and 5. FIG. 4 is a flowchart illustrating the signal processing method according to the present embodiment. In the drawing, a signal OUT1 refers to a digital output signal outputted from the first photoelectric conversion element 203, forming the photoelectric conversion unit 205, via the AD convertor 107. Moreover, a signal OUT2 refers to a digital output signal outputted from the second photoelectric conversion element 204, forming the photoelectric conversion unit 205, via the AD convertor 107.

First, in step S400, a magnitude relationship between the signal OUT1 and the signal OUT2 (whether a relationship of OUT1>OUT2 is satisfied or not) is determined. The magnitude relationship between the signal OUT1 and the signal OUT2 may be determined by directly comparing the digital signals in real-time or determined in advance based on a relationship between the exit pupil distance 208 and the horizontal image height 209 which are factors determining the position of the exit pupil image 207.

When the signal OUT1 is determined to be larger than the signal OUT2 in step S400 ("YES" in step S400), the flow proceeds to step S401. When the signal OUT2 is determined to be larger than the signal OUT1 in step S400 ("NO" in step S400), the flow proceeds to step S402.

In step S401, whether the signal OUT1 is AD-saturated or not, i.e. whether the level of the signal OUT1 is larger than the saturation signal level in the circuit unit or not is determined. When the signal OUT1 is determined to be AD-saturated ("YES" in step S401), the signal data of the signal OUT1 is replaced by signal data obtained by multiplying the value of the signal OUT2 by k (step S403) and the obtained signal data is outputted as the signal OUT1 (step S405). Specifically, these signal data can be expressed by the following linear expression:

$$OUT1' = k \times OUT2$$

where OUT2 is the signal data of the signal OUT2 and OUT1' is the signal data after replacement.

When the signal OUT1 is determined not to be AD-saturated ("NO" in step S401), the signal OUT1 is outputted as it is (step S405).

Similarly, in step S402, whether the signal OUT2 is AD-saturated or not is determined. When the signal OUT2 is determined to be AD-saturated ("YES" in step S402), the signal data of the signal OUT2 is replaced by signal data obtained by multiplying the value of the signal OUT1 by k (step S404) and the obtained signal data is outputted as the signal OUT2 (step S406). When the signal OUT2 is determined not to be AD-saturated ("NO" in step S402), the signal OUT2 is outputted as it is (step S406).

A correction coefficient k which is also a slope coefficient in the aforementioned linear expression is calculated based on the horizontal image height 209 as well as the exit pupil distance 208 and the pupil diameter 210 of the imaging lens which are factors determining a ratio between the signal OUT1 and the signal OUT2. A calculation formula for calculating the correction coefficient k is determined in advance based on simulation or data of actual measurement.

Table 1 is an example of a lookup table used to determine the correction coefficient k.

TABLE 1

| EPD | F-Number | | | | | | | | |
|---|---|---|---|---|---|---|---|---|---|
| | F1.0 | F1.4 | F2.0 | F2.8 | F4.0 | F5.6 | F8.0 | F11 | F16 |
| ~40 | $f_{11}(x)$ | $f_{12}(x)$ | $f_{13}(x)$ | $f_{14}(x)$ | $f_{15}(x)$ | $f_{16}(x)$ | $f_{17}(x)$ | $f_{18}(x)$ | $f_{19}(x)$ |
| 40~60 | $f_{21}(x)$ | $f_{22}(x)$ | $f_{23}(x)$ | $f_{24}(x)$ | $f_{25}(x)$ | $f_{26}(x)$ | $f_{27}(x)$ | $f_{28}(x)$ | $f_{29}(x)$ |
| 60~80 | $f_{31}(x)$ | $f_{32}(x)$ | $f_{33}(x)$ | $f_{34}(x)$ | $f_{35}(x)$ | $f_{36}(x)$ | $f_{37}(x)$ | $f_{38}(x)$ | $f_{39}(x)$ |
| 80~100 | $f_{41}(x)$ | $f_{42}(x)$ | $f_{43}(x)$ | $f_{44}(x)$ | $f_{45}(x)$ | $f_{46}(x)$ | $f_{47}(x)$ | $f_{48}(x)$ | $f_{49}(x)$ |
| 100~120 | $f_{51}(x)$ | $f_{52}(x)$ | $f_{53}(x)$ | $f_{54}(x)$ | $f_{55}(x)$ | $f_{56}(x)$ | $f_{57}(x)$ | $f_{58}(x)$ | $f_{59}(x)$ |
| 120~160 | $f_{61}(x)$ | $f_{62}(x)$ | $f_{63}(x)$ | $f_{64}(x)$ | $f_{65}(x)$ | $f_{66}(x)$ | $f_{67}(x)$ | $f_{68}(x)$ | $f_{69}(x)$ |
| 160~200 | $f_{71}(x)$ | $f_{72}(x)$ | $f_{73}(x)$ | $f_{74}(x)$ | $f_{75}(x)$ | $f_{76}(x)$ | $f_{77}(x)$ | $f_{78}(x)$ | $f_{79}(x)$ |
| 200~240 | $f_{81}(x)$ | $f_{82}(x)$ | $f_{83}(x)$ | $f_{84}(x)$ | $f_{85}(x)$ | $f_{86}(x)$ | $f_{87}(x)$ | $f_{88}(x)$ | $f_{89}(x)$ |
| 240~ | $f_{91}(x)$ | $f_{92}(x)$ | $f_{93}(x)$ | $f_{94}(x)$ | $f_{95}(x)$ | $f_{96}(x)$ | $f_{97}(x)$ | $f_{98}(x)$ | $f_{99}(x)$ |

This lookup table is a table for extracting a function f of the horizontal image height x, based on the exit pupil distance (EPD) of the imaging lens and the F-number determining the pupil diameter. The correction coefficient k for the outputs of the photoelectric conversion elements 203, 204 of the photoelectric conversion unit 205 can be calculated by substituting the image height x of the photoelectric conversion unit 205 for the extracted function f. It is known from the studies of the inventors that the function f can be defined by a polynomial of third-order or less. Using such a lookup table can simplify the calculation of the correction coefficient k. Moreover, expressing the correction coefficient k with a function continuous with respect to the image height can prevent the correction coefficient from having discontinuance values and suppress occurrence of a step in the captured image.

The following equation (1) is given as an example of the function f for obtaining the correction coefficient k.

$$k = f(x) = ax^3 + bx^2 + cx + 1 \quad (1)$$

In the equation (1), the coefficients a, b, c are determined based on an angle of view and a pupil distance of a sensor, a shrink ratio of the microlenses 206, the F-number of the lens, and the like. Moreover, x is the horizontal image height. The correction coefficient k at a position where image height x=0 (optical center) is satisfied is normally 1.

As described above, an effect of improved linearity of the input-output characteristic can be obtained in the photoelectric conversion units 205 in the entire imaging region 100 by calculating an appropriate correction coefficient k for each imaging condition.

FIG. 5 is a graph illustrating input-output characteristics after processing the signal processing method according to the present embodiment on the input-output characteristics of FIG. 3. In the input-output characteristics illustrated in FIG. 5, the characteristics at or below the light amount Ia at which the output from the photoelectric conversion element 203 is AD-saturated are the same as the input-output characteristics illustrated in FIG. 3. However, at or above the light amount Ia, the output signal from the photoelectric conversion element 203 is corrected to the signal level which is k-times the digital data outputted from the photoelectric conversion element 204, and the input-output characteristic 301' is thus obtained. This means that the output from the photoelectric conversion element 203 can be indirectly measured up to a signal level V3 which is k-times larger than the signal level V1 at which the AD saturation occurs. As a result, a change rate of a signal level relative to the light amount of an input-output characteristic 303' obtained by substituting the input-output characteristics 301' and the input-output characteristics 302 at or above the light amount Ia approximates to that at or below the light amount Ia. Moreover, a slope of the input-output characteristic 303' is constant until the light amount reaches the light amount Ic, and the linearity of the input-output characteristic is improved. Furthermore, a saturation signal level of the input-output characteristic 303' is a signal level V4 (=V1+V3) which is larger than the signal level V2 before the correction, and an effect of increasing the dynamic range can be also obtained.

Similar effects on the linearity of the input-output characteristic can be also obtained in the technique described in Japanese Patent Application Laid-Open No. 2013-149743. However, a saturation level of a signal charge in photoelectric conversion elements is low due to reduction of a potential barrier between the photoelectric conversion elements. Moreover, although effects on the saturation of the signal charge in the photoelectric conversion elements can be obtained, no effects on the AD saturation in a signal processing step performed thereafter can be obtained, and the effects of this technique are thus limited. Particularly, in a mode where each of the photoelectric conversion units 205 has the read-out circuit and the signals are outputted by being amplified by the column amplifies as in the solid-state imaging device according to the present embodiment, saturation of signal voltage and digital data is likely to occur, and no effects on such saturation can be obtained in the technique described in Japanese Patent Application Laid-Open No. 2013-149743. Specifically, since the saturation of the signal charge occurs only in low-ISO speed imaging in which illuminance of a subject is sufficient and there is no need to amplify the signals with the column amplifiers, the effects of the technique described in Japanese Patent Application Laid-Open No. 2013-149743 are very limited.

As described above, according to the present embodiment, when one pixel signal is generated based on the signals from the plurality of photoelectric conversion elements, the linearity of the input-output characteristic is improved in consideration of the saturation of the signal in the circuit unit. Accordingly, degrading of the image quality of a captured image, particularly in a bright portion, can be suppressed.

Second Embodiment

A solid-state imaging device and a signal processing method according to a second embodiment of the present invention will be described with reference to FIGS. 6 to 9. Components which are the same as the components in the solid-state imaging device and the signal processing method according to the first embodiment illustrated in FIGS. 1 to 5 are denoted by the same reference numerals and descriptions thereof are omitted or simplified.

Figure 6:
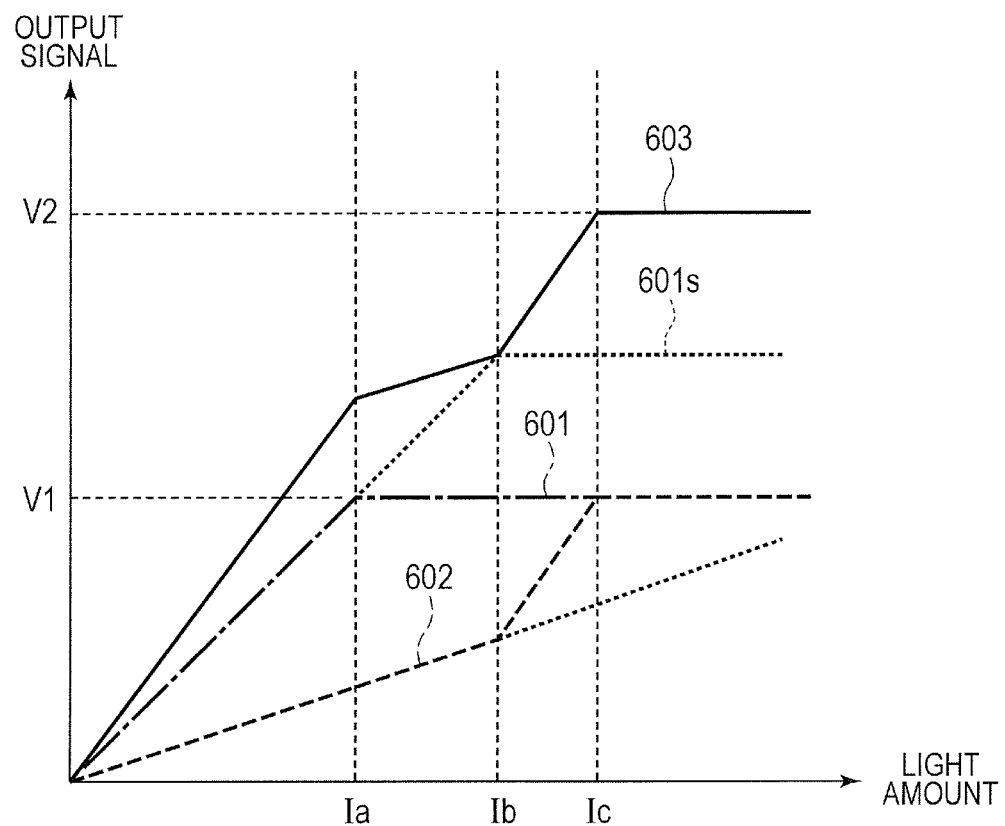
FIG. 6 is a graph illustrating another example of input-output characteristics before the signal processing according to the first embodiment of the present invention.
Figure 7:
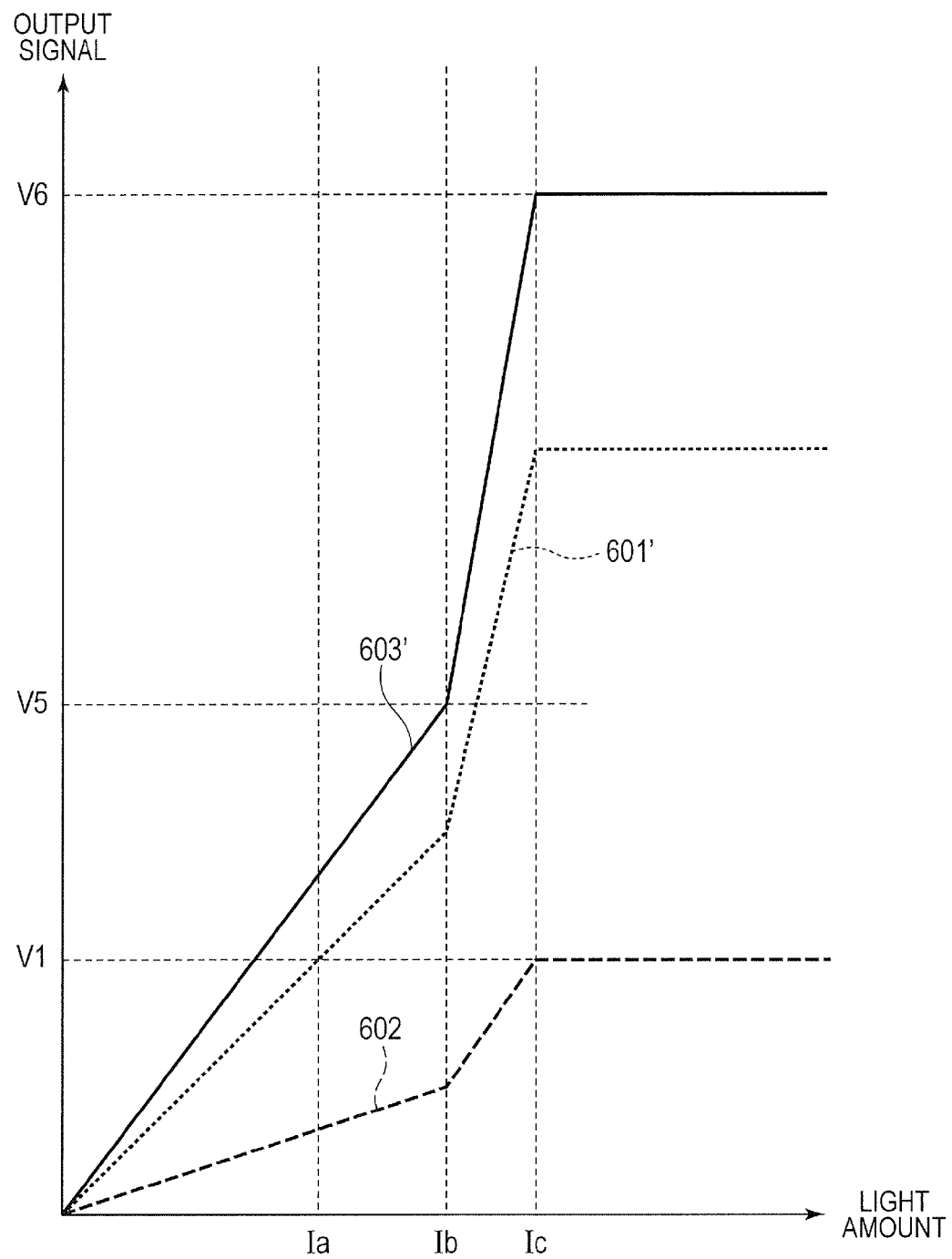
FIG. 7 is a graph illustrating an example of input-output characteristics after the signal processing according to the first embodiment of the present invention on the input-output characteristics of FIG. 6.
Figure 8:
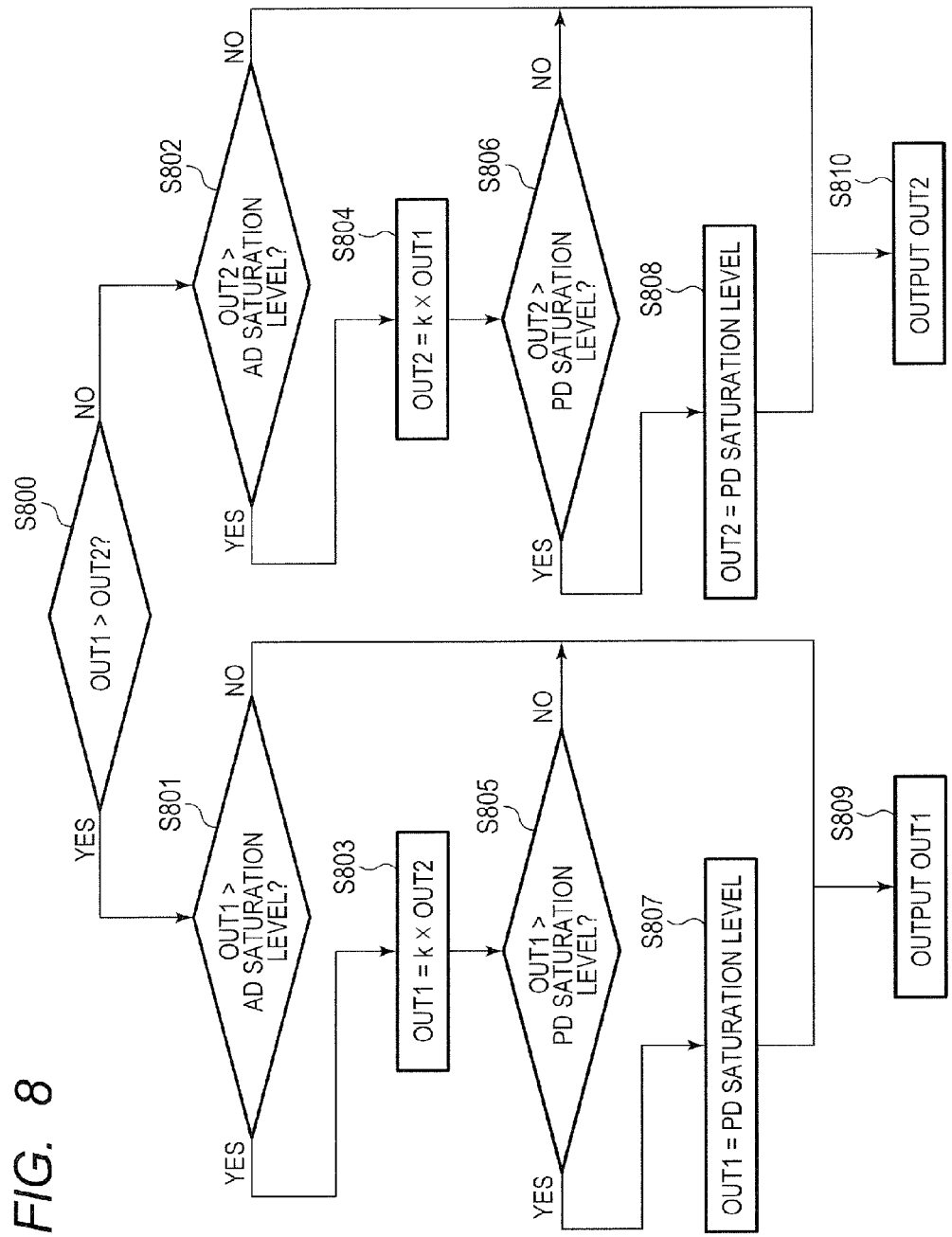
FIG. 8 is a flowchart illustrating a signal processing method in a solid-state imaging device according to a second embodiment of the present invention.
Figure 9:
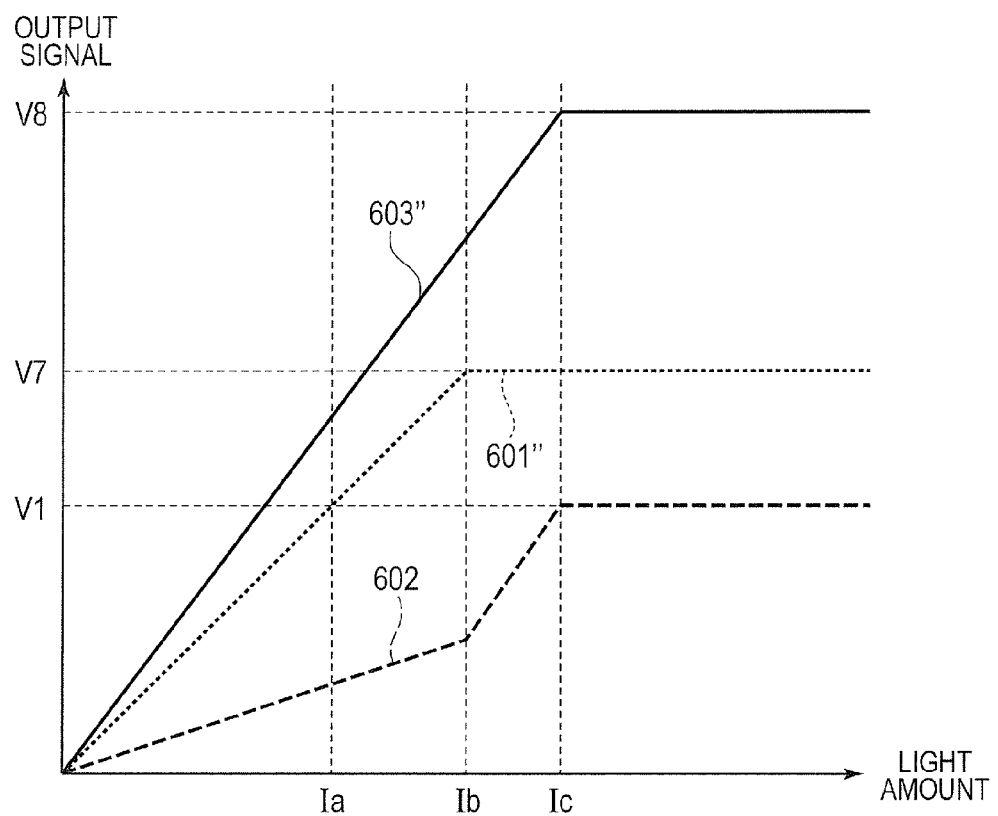
FIG. 9 is a graph illustrating an example of input-output characteristics obtained by the signal processing method in the solid-state imaging device according to the second embodiment of the present invention.

FIG. 6 is a graph illustrating another example of input-output characteristics before the signal processing in the first embodiment. FIG. 7 is a graph illustrating an example of input-output characteristics after the signal processing in the first embodiment on the input-output characteristics of FIG. 6. FIG. 8 is a flowchart illustrating the signal processing method in the solid-state imaging device according to the present embodiment. FIG. 9 is a graph illustrating an example of input-output characteristics obtained by the signal processing method in the solid-state imaging device according to the present embodiment.

In the first embodiment, description is given of the signal processing method for improving the linearity of the input-output characteristic of the signal data for the pixel forming the captured image when the output from one of the photoelectric conversion elements is AD-saturated. However, depending on the saturation charge amount of the photoelectric conversion elements, the following situation may occur: an output from one of the photoelectric conversion elements is not AD-saturated but the amount of charges generated in the other photoelectric conversion element exceeds the saturation charge amount (hereafter, referred to as "PD saturation"). A signal level at which the PD saturation occurs is a predetermined signal level determined depending on the configuration of the photoelectric conversion elements. An example of such a situation can be described below by using, for example, the graph illustrated in FIG. 6.

FIG. 6 is, like FIG. 3, a graph illustrating input-output characteristics of AD conversion data, which is an output from a photoelectric conversion unit 205, before the signal processing of the present invention. An input-output characteristic 601 is an input-output characteristic of a photoelectric conversion element 203 with relatively-high sensitivity out of two photoelectric conversion elements 203, 204, while an input-output characteristic 602 is an input-output characteristic of a photoelectric conversion element 204 with relatively-low sensitivity. Combination of the input-output characteristics 601, 602 is an input-output characteristic 603. The horizontal axis represents an inputted light amount, and the vertical axis represents a signal level of digital data after the AD conversion.

Assume that, when light falls on the photoelectric conversion unit 205 including the photoelectric conversion elements 203, 204 described above, an output of the photoelectric conversion element 203 is AD-saturated at the light amount Ia, and the photoelectric conversion element 203 is PD-saturated at a light amount Ib. Note that a saturation signal level of a circuit unit is assumed to be the signal level V1 as in FIG. 3.

The output signal from the photoelectric conversion element 203 has the input-output characteristic 601 illustrated by the one-dot chain line in FIG. 6. The input-output characteristic 601 is such that the output signal level increases in proportion to the light amount when the light amount is smaller than the light amount Ia, but is AD-saturated at V1 when the light amount is equal to or larger than the light amount Ia. If there is no AD saturation, the output signal increases in proportion to the light amount until the light amount reaches the light amount Ib corresponding to a PD-saturation signal level of the photoelectric conversion element 203, as depicted by an input-output characteristic 601s illustrated by the broken line in FIG. 6.

The output signal from the photoelectric conversion element 204 has the input-output characteristic 602 illustrated by the broken line in FIG. 6. The input-output characteristic 602 is such that the output signal increases in proportion to the light amount until the light amount reaches the light amount Ib. When the light amount reaches or exceeds the light amount Ib, the photoelectric conversion element 203 is PD-saturated, and charges overflowing from the photoelectric conversion element 203 flows into the photoelectric conversion element 204. This adds a signal corresponding to the flowing-in charges and the slope thereby increases. The signal of the photoelectric conversion element 204 is AD-saturated at the signal level V1 when the light amount is the light amount Ic.

A characteristic obtained by adding the input-output characteristic 601 and the input-output characteristic 602 is the input-output characteristic 603 illustrated by the solid line in FIG. 6. As is apparent from FIG. 6, the slope of the input-output characteristic 603 changes at and above the light amount Ia and the linearity thereof is degraded. The input-output characteristic as illustrated in FIG. 6 may frequently occur in the circuit configuration according to the present embodiment.

When the signal processing of the first embodiment is processed for such input-output characteristics, the input-output characteristics 601, 603 become input-output characteristics 601', 603' as illustrated in FIG. 7. Specifically, in the calculation of the data outputted from the photoelectric conversion element 203, the value of the output of the photoelectric conversion element 204 is multiplied by k while including the signal based on the signal charge overflowing from the photoelectric conversion element 203 and flowing into the photoelectric conversion element 204. As a result, excessive correction is performed at or above the light amount Ib, and the linearity cannot be sufficiently improved.

In view of this, the signal processing according to the flowchart illustrated in FIG. 8 is performed in the present embodiment.

First, in step S800, a magnitude relationship between a signal OUT1 and a signal OUT2 (whether a relationship of OUT1>OUT2 is satisfied or not) is determined. When the signal OUT1 is determined to be larger than the signal OUT2 in step S800 ("YES" in step S800), the flow proceeds to step S801. When the signal OUT2 is determined to be larger than the signal OUT1 in step S800 ("NO" in step S800), the flow proceeds to step S802.

In step S801, whether the signal OUT1 is AD-saturated in the circuit unit or not is determined. When the signal OUT1 is determined to be AD-saturated ("YES" in step S801), the signal data of the signal OUT1 is replaced by signal data obtained by multiplying the value of the signal OUT2 by k (step S803) and the flow proceeds to step S805.

In step S805, whether the amount of light inputted to the photoelectric conversion element outputting the signal OUT1 is larger than the PD saturation level or not, i.e. whether the photoelectric conversion element is PD-saturated or not is determined. When the photoelectric conversion element is determined to be PD-saturated ("YES" in step S805), the signal OUT1 is replaced by the saturation level of the photoelectric conversion element (step S807) and the saturation level is outputted as the signal OUT1 (step S809). When the signal OUT1 is determined not to be AD-saturated ("NO" in step S801) and when the photoelectric conversion element is determined not to be PD-saturated ("NO" in step S805), the signal OUT1 is outputted as it is (step S809).

Similarly, in step S802, whether the signal OUT2 is AD-saturated in the circuit unit or not is determined. When the signal OUT2 is determined to be AD-saturated ("YES" in step S802), the signal data of the signal OUT2 is replaced by signal data obtained by multiplying the value of the signal OUT1 by k (step S804) and the flow proceeds to step S806.

In step S806, whether the amount of light inputted to the photoelectric conversion element outputting the signal OUT2 is larger than the saturation level or not, i.e. whether the photoelectric conversion element is PD-saturated or not is determined. When the photoelectric conversion element is determined to be PD-saturated ("YES" in step S806), the signal OUT2 is replaced by the saturation level of the photoelectric conversion element (step S808) and the saturation level is outputted as the signal OUT2 (step S810). When the signal OUT2 is determined not to be AD-saturated ("NO" in step S802) and when the photoelectric conversion element is determined not to be PD-saturated ("NO" in step S806), the signal OUT2 is outputted as it is (step S810).

As described above, the signal processing method according to the present embodiment is different from the signal processing method according to the first embodiment in that, after being corrected with the correction coefficient k, the output signal is further compared with the PD-saturation signal level of the photoelectric conversion element. The PD-saturation signal level of the photoelectric conversion element herein is an output signal level in the case where a signal charge obtained by photoelectric conversion in the photoelectric conversion element reaches the upper limit of accumulation. The saturation level of the photoelectric conversion element is obtained in advance. When a signal is corrected by performing multiplication by k and the signal level thereof resultantly exceeds the saturation level of the photoelectric conversion element, the signal is replaced by the PD-saturation signal level of the photoelectric conversion element. In other words, the output signal level of the photoelectric conversion element is set to the PD-saturation signal level. This can prevent the input-output characteristics from being excessively corrected as in FIG. 7.

FIG. 9 is a graph illustrating input-output characteristics after the signal processing according to the present embodiment on the input-output characteristics in FIG. 6. Input-output characteristics 601", 603" are input-output characteristics after the signal processing according to the present embodiment on the input-output characteristics 601, 603, respectively.

As illustrated in FIG. 9, when the amount of light incident on the photoelectric conversion unit 205 is smaller than the light amount Ib at which the PD saturation occurs in the photoelectric conversion element 203, the input-output characteristics are the same as the input-output characteristics after processing the signal processing method according to the first embodiment illustrated in FIG. 5. Specifically, in a range between the light amount Ia and the light amount Ib, the output signal level of the photoelectric conversion element 203 is replaced by a signal level obtained by multiplying the output signal level of the photoelectric conversion element 204 by the correction coefficient k.

When the amount of light incident on the photoelectric conversion unit 205 exceeds the light amount Ib and the output signal level of the photoelectric conversion element 203 is determined to exceed a signal level V7 corresponding to the PD-saturation signal level, the output signal level of the photoelectric conversion element 203 is replaced by the PD-saturation signal level (=V7). Specifically, when the incident light amount exceeds the light amount Ib, the charges generated in the photoelectric conversion element 203 starts to overflow to the adjacent photoelectric conversion element 204. If the output signal level of the photoelectric conversion element 203 is calculated from the output signal level of the photoelectric conversion element 204 including the charges overflowing from the photoelectric conversion element 203, excessive correction is performed. The output signal level of the photoelectric conversion element 203 is thus replaced by the PD saturation level.

As a result, the linearity of the input-output characteristic 603" can be improved up to the light amount Ic at which the AD saturation occurs in the photoelectric conversion element 204. Moreover, the saturation signal level of the input-output characteristics 603" is a signal level V8 (=V1+V7) which is larger than the signal level V2 before the correction, and an effect of increasing the dynamic range can be also obtained in addition to the improvement of linearity.

As described above, according to the present embodiment, when one pixel signal is generated based on the signals from the plurality of photoelectric conversion elements, the linearity of the input-output characteristic is improved in consideration of the saturation of the signal in the circuit unit and the photoelectric conversion element. Accordingly, degrading of the image quality of a captured image can be suppressed.

Third Embodiment

An imaging system according to a third embodiment of the present invention will be described with reference to FIG. 10. FIG. 10 is a block diagram illustrating a schematic configuration of the imaging system according to the present embodiment. Components which are the same as the components in the solid-state imaging devices in the first and second embodiments illustrated in FIGS. 1 to 9 are denoted by the same reference numerals and descriptions thereof are omitted or simplified.

An imaging system 1000 according to the present embodiment is not limited to a particular system, and can be applied to, for example, a digital still camera, a digital camcorder, a camera head, a photocopier, a fax machine, a mobile phone, a vehicle-mounted camera, an observation satellite, and the like.

As illustrated in FIG. 10, the imaging system 1000 includes a solid-state imaging device 1001, a lens 1002, an aperture 1004, a barrier 1006, a signal processing unit 1008, a timing generating unit 1010, and a general control/operation unit 1012. The imaging system 1000 also includes a memory unit 1014, a storage medium control I/F unit 1016, and an external I/F unit 1018.

The lens 1002 is a component for focusing an optical image of a subject on an imaging region 100 of the solid-state imaging device 1001. The aperture 1004 is a component for changing the amount of light passing through the lens 1002. The barrier 1006 is a component for protecting the lens 1002. The solid-state imaging device 1001 is the solid-state imaging device described in the aforementioned embodiments, and outputs signals based on the optical image focused by the lens 1002 to the signal processing unit 1008. The signals outputted from the solid-state imaging device 1001 include A signals outputted from photoelectric conversion elements 101 of photoelectric conversion units 103 and B signals outputted from photoelectric conversion elements 102 of the photoelectric conversion units 103.

The signal processing unit 1008 performs desired processing, correction, data compression, and the like on the signals outputted from the solid-state imaging device 1001. The signal processing unit 1008 includes AD convertors 107 for performing AD conversion of the signals outputted from the solid-state imaging device 1001 and a DSP 108 for processing digital signals outputted from the AD convertors. Processing performed by the signal processing unit 1008 includes processing of generating image data subjected to the correction by means of signal processing described in the aforementioned embodiments, processing of obtaining information on the distance to a subject based on the A signals and the B signals, and similar processing. The signal processing unit 1008 may be mounted on the same substrate as the solid-state imaging device 1001 or on another substrate. Alternatively, the configuration may be such that some of the functions of the signal processing unit 1008 are mounted on the same substrate as the solid-state imaging device 1001 and the other functions of the signal processing unit 1008 are mounted on another substrate.

The timing generating unit 1010 is a component for outputting various timing signals to the solid-state imaging device 1001 and the signal processing unit 1008. The general control/operation unit 1012 is a control unit handling computation processing and drive of the entire imaging system 1000. The timing signals and the like may be inputted from the outside of the imaging system 1000, and the imaging system 1000 only needs to include at least the solid-state imaging device 1001 and the signal processing unit 1008 configured to process the signals outputted from the solid-state imaging device 1001.

The memory unit 1014 is a frame memory unit for temporarily storing image data. The storage medium control I/F unit 1016 is an interface unit for writing data into a storage medium 1020 or reading data out from the storage medium 1020. The external I/F unit 1018 is an interface unit for performing communication with an external computer and the like. The storage medium 1020 is a removable storage medium such as a semiconductor memory for performing writing or reading of captured image data.

A high-performance imaging system capable of obtaining high-quality images with a wide dynamic range can be achieved by configuring the imaging system 1000 such that the solid-state imaging device and the signal processing method according to the first and second embodiments are applied to the imaging system 1000 as described above.

Modified Embodiment

The present invention is not limited to the aforementioned embodiments, and various modifications can be made.

For example, in the aforementioned embodiments, the saturation in the circuit unit is detected in the AD convertor. Meanwhile, in the case of an analog signal, the voltage saturation sometimes occurs at an upper limit value of a dynamic range of the circuit. The present invention can be also applied to a configuration in which the voltage saturation of the analog signal is detected instead of the saturation of the digital output signal.

Moreover, in the aforementioned embodiments, the example is given in which each of the photoelectric conversion units 103 includes the two, left and right divided photoelectric conversion elements 101, 102. However, the photoelectric conversion unit 103 may include two, upper and lower divided photoelectric conversion elements. The correction coefficient k in this case is defined as a function of a vertical image height. Alternatively, the photoelectric conversion unit 103 may include a combination of upper and lower divided elements and right and left divided elements, or may include three or more divided elements in each direction. The usage of the signals outputted from the divided photoelectric conversion elements is not limited to focus detection, and the present invention can be also applied to a three-dimensional image, a distance detection sensor, a light-field sensor, and the like.

Moreover, in the aforementioned embodiments, the configuration is such that the two signal output lines 105 are arranged in each column and the A signal and the B signal are outputted via the separate signal output lines 105. However, the solid-state imaging device may be configured such that one signal output line 105 is arranged in each column. In this case, for example, the A signal and an A+B signal are read at different timings, and the B signal is calculated by subtracting the A signal from the A+B signal. Signal processing after this calculation is the same as that in the aforementioned embodiments.

Moreover, in the aforementioned first embodiment, description is given of the case where the output signal from the photoelectric conversion element 203 is saturated in the circuit unit. However, the same signal processing as that in the first embodiment can be also applied to the case where saturation occurs in the photoelectric conversion element 203 before the saturation in the circuit unit.

Moreover, in the aforementioned second embodiment, description is given of the photoelectric conversion unit 205 having the configuration in which the charges overflowing from the photoelectric conversion element 203 flows into the photoelectric conversion element 204. However, there is no need for the photoelectric conversion unit 205 to have the configuration in which the charges overflowing from the photoelectric conversion element 203 flows into the photoelectric conversion element 204. In this case, the same processing as the signal processing method according to the first embodiment is performed, except for the processing in which the output signal from the photoelectric conversion element 203 is clipped to the signal level corresponding to the saturation charge amount of the photoelectric conversion element 203 when exceeding this signal level.

Furthermore, in a solid-state imaging device having many pixels, a defect sometimes occurs in some of the pixels. In a general defective pixel correction, there is performed processing in which data of a defective pixel is obtained in advance and the defective pixel is interpolated depending on an imaging environment by using signals of non-defective pixels around the defective pixel. Use of the signal processing methods according to the aforementioned embodiments enables the following processing. When one of a pixel outputting an a signal and a pixel outputting a b signal is a defective pixel, the signal level of the defective pixel can be calculated from the signal level of the other pixel by utilizing the correction coefficient k like one described above.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-084837, filed Apr. 17, 2015, which is hereby incorporated by reference herein in its entirety.

What is claimed is:

1. A solid-state imaging device comprising:
a photoelectric conversion unit including one microlens and a plurality of photoelectric conversion elements, wherein each photoelectric conversion element accumulates charges based on incident light passing through the one microlens detected by the photoelectric conversion element;
a read-out circuit electrically connected to the photoelectric conversion unit, and configured to read out a first signal based on charges accumulated by a first one of the plurality of photoelectric conversion elements, and to read out a second signal based on charges accumulated by a second one of the plurality of photoelectric conversion elements; and
a signal processor electrically connected to the read-out circuit, and configured to, in a case where the first signal is larger than a predetermined saturation signal level and the second signal, correct the first signal to a predetermined signal level based on the second signal so that a change rate of a third signal obtained by adding the first signal and the second signal relative to a light amount approximates to a change rate of the third signal relative to a light amount in a case where the first signal is smaller than the predetermined saturation signal level,
wherein the signal processor further performs predetermined processing to the corrected first signal and the second signal to generate image data of the subject or information on a distance to the subject, and outputs the generated image data to a memory unit or outputs the generated information to control an optical system.

2. The solid-state imaging device according to claim 1, wherein the saturation signal level is a signal level corresponding to a saturation charge amount of the photoelectric conversion element.

3. The solid-state imaging device according to claim 1, wherein the signal processor outputs the third signal obtained by adding the first signal and the second signal.

4. The solid-state imaging device according to claim 1, wherein the first signal is an output signal of a defective pixel.

5. The solid-state imaging device according to claim 1, comprising a plurality of the photoelectric conversion units.

6. The solid-state imaging device according to claim 1, wherein the saturation signal level is a saturation signal level of the read-out circuit.

7. The solid-state imaging device according to claim 6, wherein, in a case where the corrected first signal is larger than a signal level corresponding to a saturation charge amount of the photoelectric conversion element, the signal processor sets the first signal to the signal level corresponding to the saturation charge amount.

8. The solid-state imaging device according to claim 1, wherein the signal processor corrects a signal level of the first signal in accordance with a linear expression using a signal level of the second signal as a variable.

9. The solid-state imaging device according to claim 8, wherein a slope coefficient of the linear expression is calculated based on a polynomial using an image height of the photoelectric conversion element as a variable.

10. The solid-state imaging device according to claim 9, wherein a coefficient of the polynomial is calculated based on at least one of a horizontal image height of the photoelectric conversion element, a vertical image height of the photoelectric conversion element, an exit pupil distance of an imaging lens, and an F-number of the imaging lens.

11. A signal processing method performed by a solid-state imaging device including:
a photoelectric conversion unit including one microlens and a plurality of photoelectric conversion elements, wherein each photoelectric conversion element accumulates charges based on light from a subject, passing through the one microlens and detected by the photoelectric conversion element,
a read-out circuit electrically connected to the photoelectric conversion unit, and
a signal processor electrically connected to the read-out circuit,
the method comprising:
reading out by the read-out circuit, a first signal based on charges accumulated by a first one of the plurality of photoelectric conversion elements;
reading out, by the read-out circuit, a second signal based on charges accumulated by a second one of the plurality of photoelectric conversion elements; and
the signal processor, in a case where the first signal is larger than a predetermined saturation signal level and the second signal, correcting the first signal to a predetermined signal level based on the second signal so that a change rate of a third signal obtained by adding the first signal and the second signal relative to a light amount approximates to a change rate of the third signal relative to a light amount in a case where the first signal is smaller than the predetermined saturation signal level, and the signal processor performing predetermined processing to the corrected first signal and the second signal to generate image data of the subject or information on a distance to the subject, and outputting the generated image data to a memory unit or outputting the information to control an optical system.

12. An imaging system comprising:
a solid-state imaging device including:
  a photoelectric conversion unit including one microlens and a plurality of photoelectric conversion elements, wherein each photoelectric conversion element accumulates charges based on light from a subject, passing through the one microlens and detected by the photoelectric conversion element; and
  a read-out circuit electrically connected to the photoelectric conversion unit, and configured to read out a first signal based on charges accumulated by a first one of the plurality of photoelectric conversion elements, and to read out a second signal based on charges accumulated by a second one of the plurality of photoelectric conversion elements; and
  a signal processor electrically connected to the solid-state imaging device, and configured to:
    correct, in a case where the first signal is larger than a predetermined saturation signal level and the second signal, the first signal to a predetermined signal level based on the second signal so that a change rate of a third signal obtained by adding the first signal and the second signal relative to a light amount approximates to a change rate of the third signal relative to a light amount in a case where the first signal is smaller than the predetermined saturation signal level, and
    perform predetermined processing to generate image data of the subject based on a fourth signal obtained by adding the corrected first signal and the second signal and output the generated image data to a memory unit.

13. An imaging system comprising:
a solid-state imaging device including:
  a photoelectric conversion unit including one microlens and a plurality of photoelectric conversion elements, wherein each photoelectric conversion element accumulates charges based on light from a subject, passing through the one microlens and detected by the photoelectric conversion element; and
  a read-out circuit electrically connected to the photoelectric conversion unit, and configured to read out a first signal based on charges accumulated by a first one of the plurality of photoelectric conversion elements, and to read out a second signal based on charges accumulated by a second one of the plurality of photoelectric conversion elements; and
  a signal processor electrically connected to the solid-state imaging device, and configured to:
    correct, in a case where the first signal is larger than a predetermined saturation signal level and the second signal, the first signal to a predetermined signal level based on the second signal so that a change rate of a third signal obtained by adding the first signal and the second signal relative to a light amount approximates to a change rate of the third signal relative to a light amount in a case where the first signal is smaller than the predetermined saturation signal level,
    perform predetermined processing to generate information on a distance to the subject based on the corrected first signal and the second signal, and output the generated information to control an optical system, and
    perform predetermined processing to generate image data of the subject based on a fourth signal obtained by adding the corrected first signal and the second signal, and output the generated image data a memory unit.

* * * * *